United States Patent [19]

Grim

[11] Patent Number: 4,997,116

[45] Date of Patent: Mar. 5, 1991

[54] REAR MOUNTABLE CARRIER RACK

[75] Inventor: Michael Grim, Bayside, Calif.

[73] Assignee: Yakima Products, Inc., Arcata, Calif.

[21] Appl. No.: 375,786

[22] Filed: Jul. 5, 1989

[51] Int. Cl.$^5$ .................................................. B60R 9/00
[52] U.S. Cl. ........................... 224/42.03 B; 224/42.08; 224/324; 224/329; 211/18
[58] Field of Search .................. 224/42.03 B, 42.03 R, 224/42.03 A, 42.07, 42.08, 324, 329, 331; 211/18, 21, 96

[56] References Cited

U.S. PATENT DOCUMENTS

| | | | |
|---|---|---|---|
| 569,289 | 10/1896 | Lynch | 211/18 |
| 640,736 | 1/1900 | Biester | 211/96 |
| 3,329,385 | 7/1967 | Dietsch | 211/96 |
| 3,927,811 | 12/1975 | Nussbaum | 224/42.03 B |
| 4,085,874 | 4/1978 | Graber | 224/29 R |
| 4,298,151 | 11/1981 | O'Connor | 224/42.03 B |
| 4,318,501 | 3/1982 | Graber | 224/42.03 R |
| 4,394,948 | 7/1983 | Graber | 224/314 |
| 4,396,138 | 8/1983 | Kirschner | 224/324 |
| 4,513,897 | 4/1985 | Graber | 224/314 |
| 4,518,108 | 5/1985 | Allen | 224/314 |
| 4,709,840 | 12/1987 | Allen | 224/314 |
| 4,815,638 | 3/1989 | Hutyra | 224/42.03 B |
| 4,875,608 | 10/1989 | Graber | 224/42.03 B |

Primary Examiner—Linda J. Sholl
Attorney, Agent, or Firm—Townsend and Townsend

[57] ABSTRACT

A carrier rack designed for mounting to the rear of a motor vehicle is described. for the mounting of bicycles, brackets on the rack provide a four-point support attaching to the wheels of the bicycle, one above and one below the center of each of the front and rear wheels, without contacting any finished surfaces of the bicycle other than the wheel rims. The brackets are pivotally mounted to the frame so that they extend outward perpendicular to the frame when in use and are rotatable into the plane of the frame when not in use. Manually operated locking features secure the support arms in either of the two positions. Also disclosed is a carrier rack frame which engages the rear bumper of the vehicle and has straps to secure the frame under tension to such features as the top edge of a hatchback window and tow loops beneath the chassis. Unique methods of securement to these features are disclosed.

5 Claims, 6 Drawing Sheets

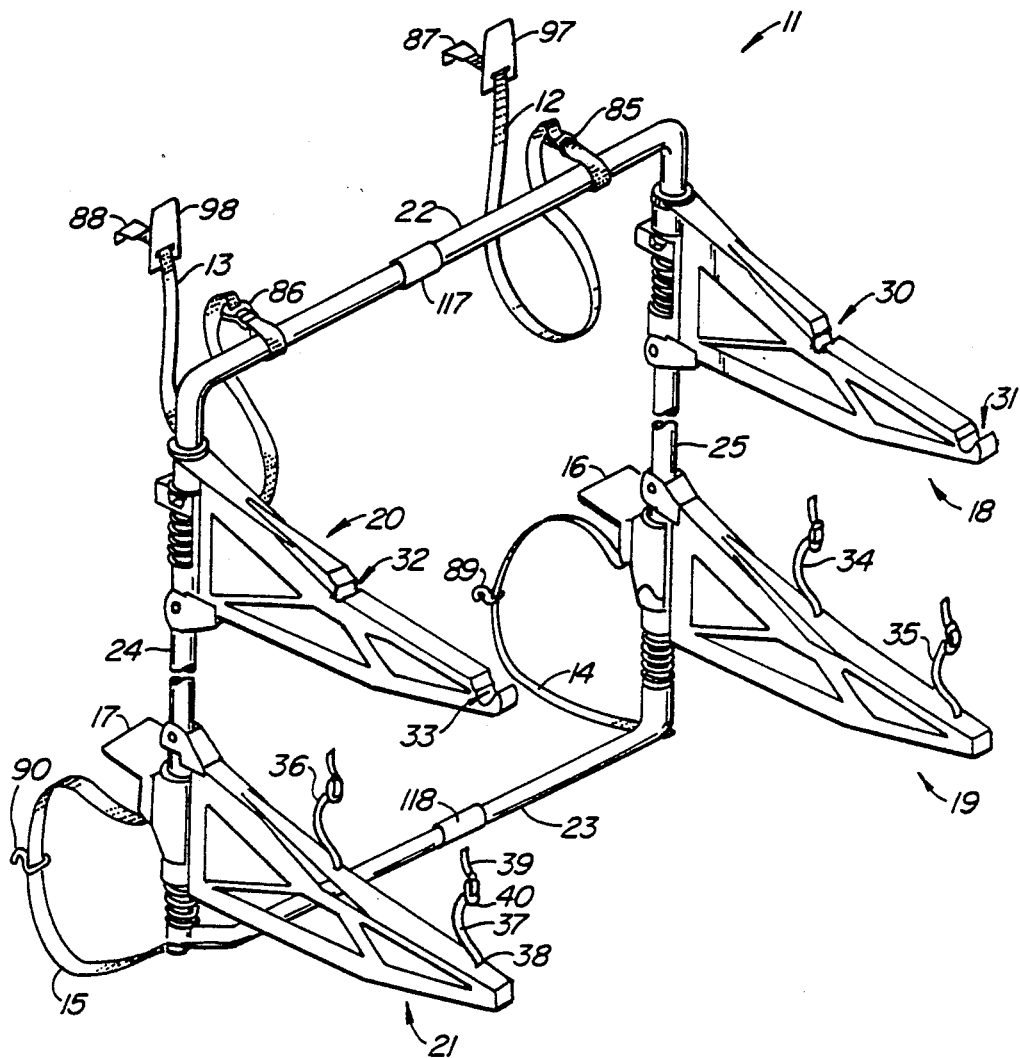
FIG._1.

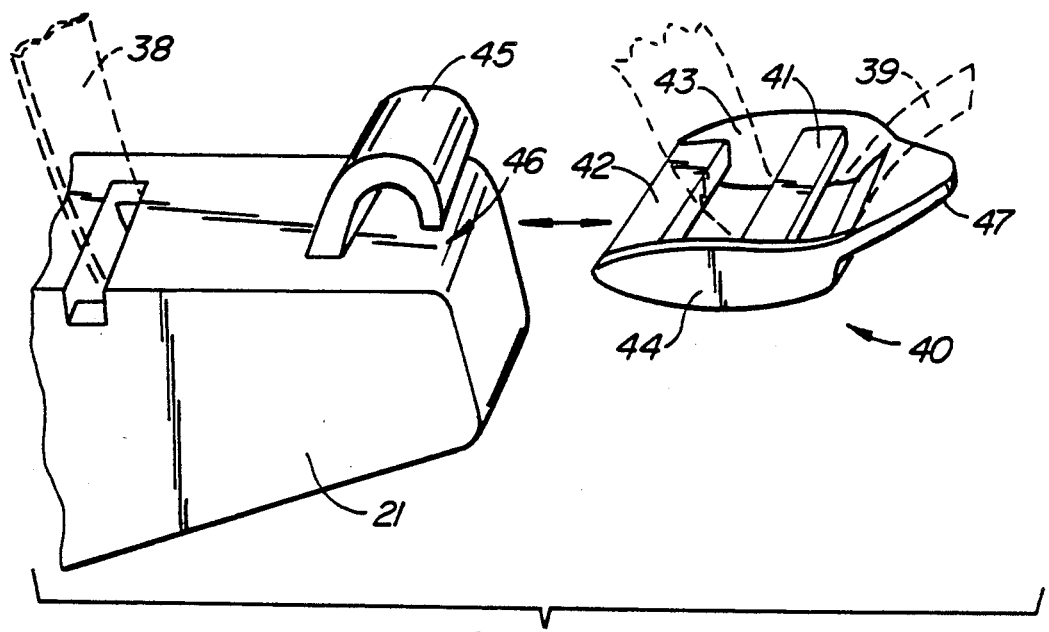
FIG._2a.
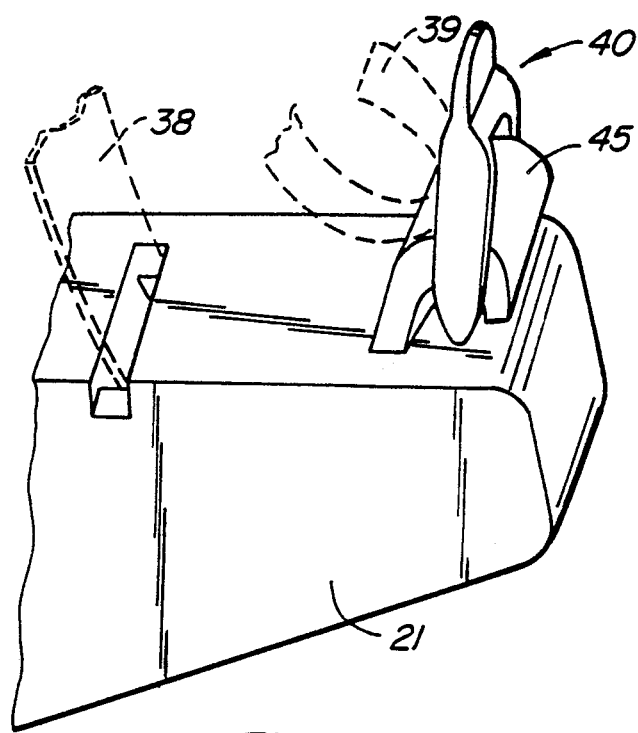
FIG._2b.

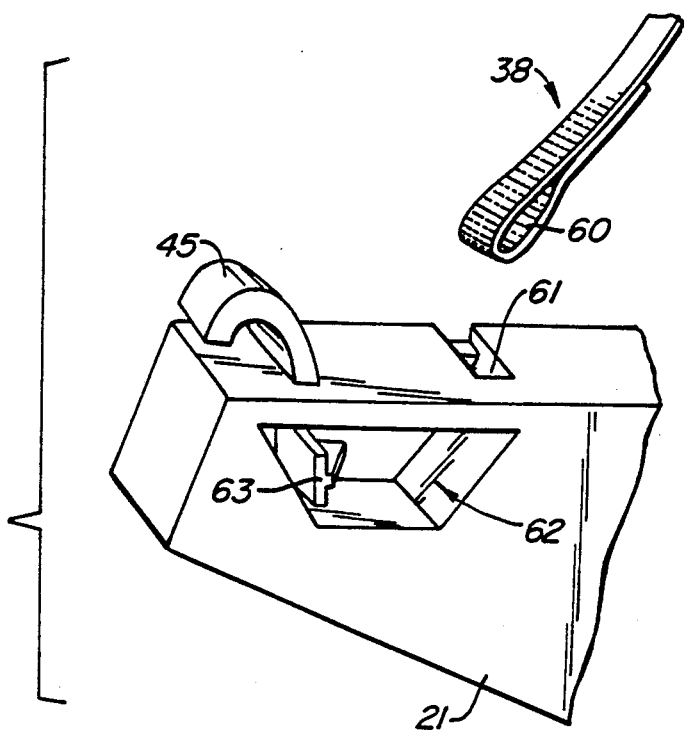
FIG_3.
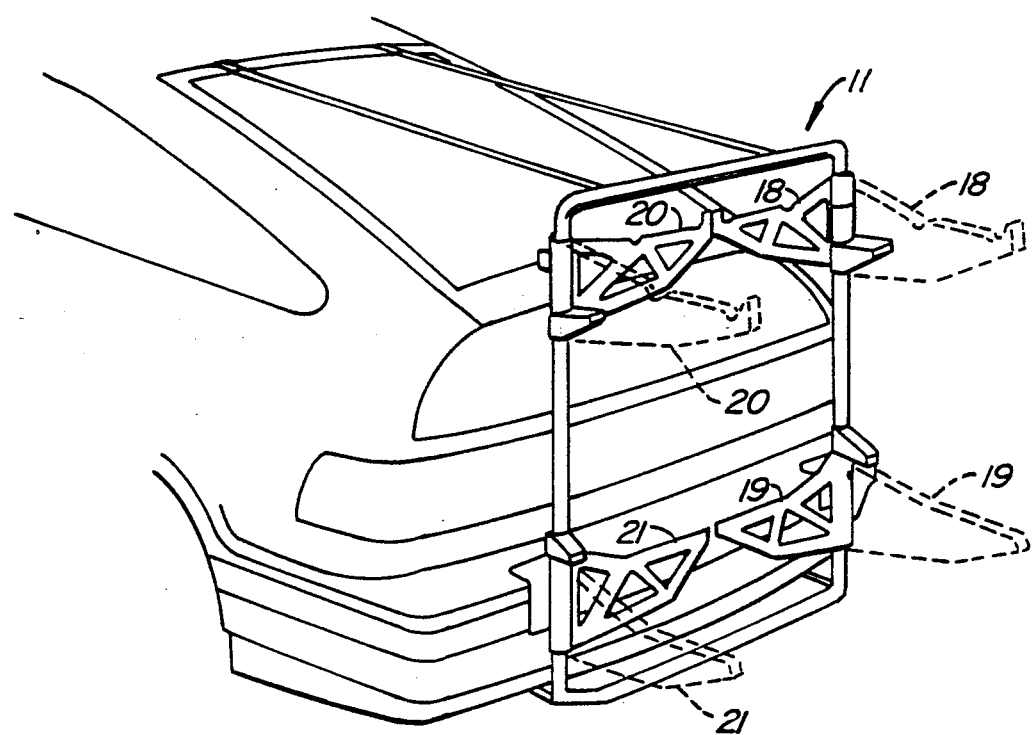
FIG_4.

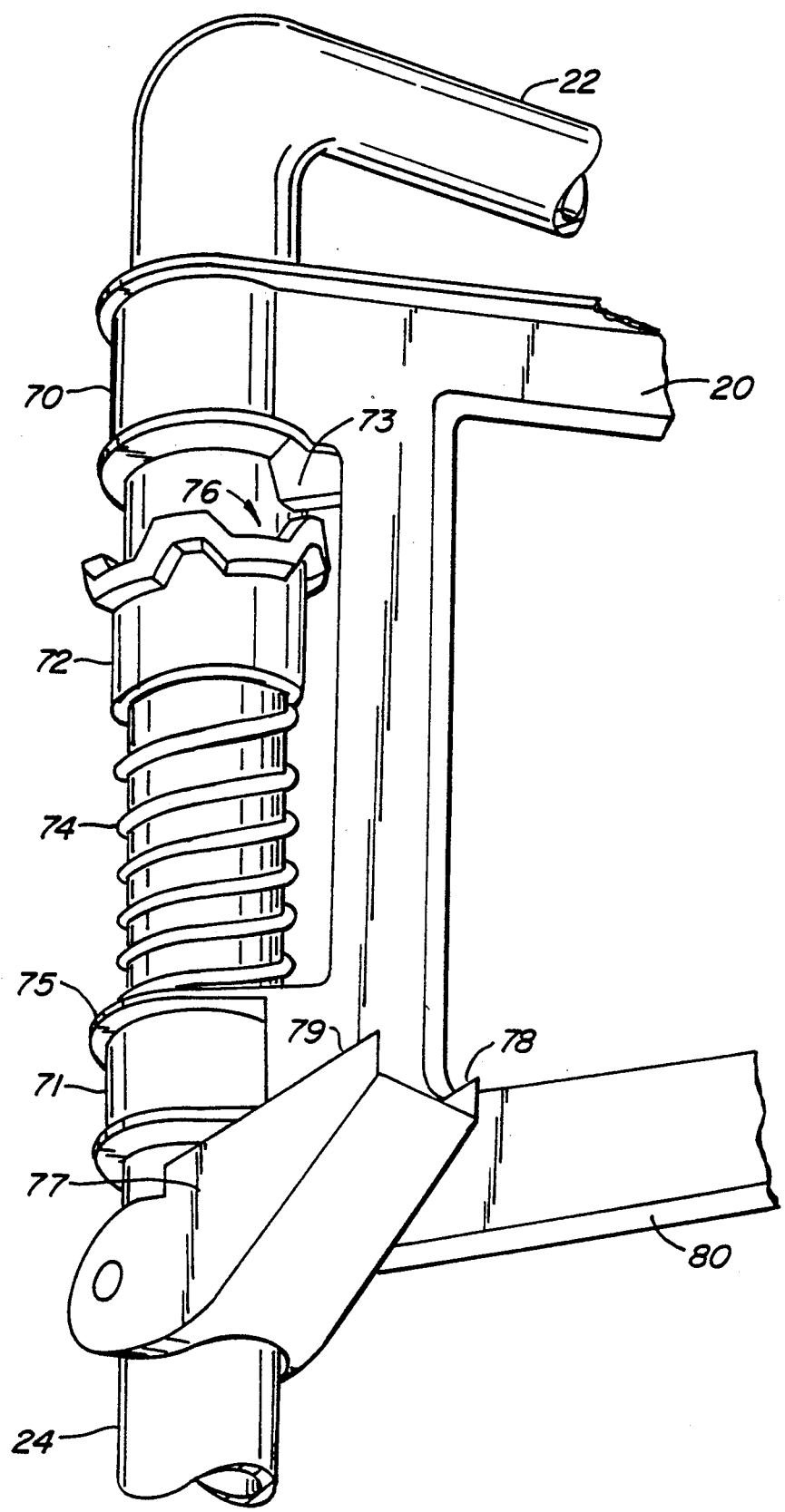
FIG._5.

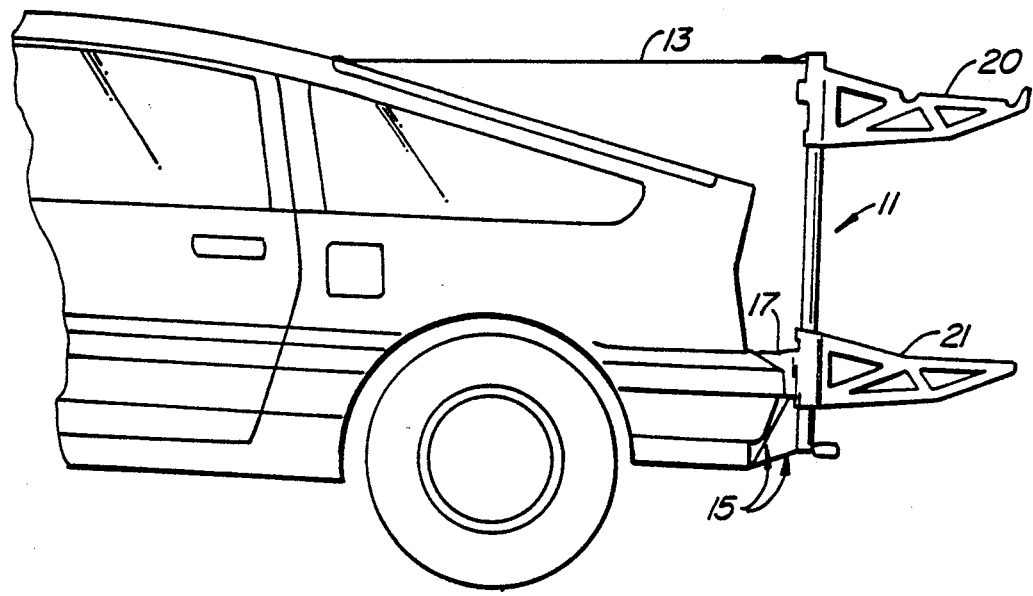
FIG._6.
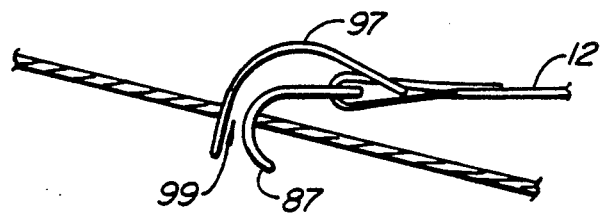
FIG._8.
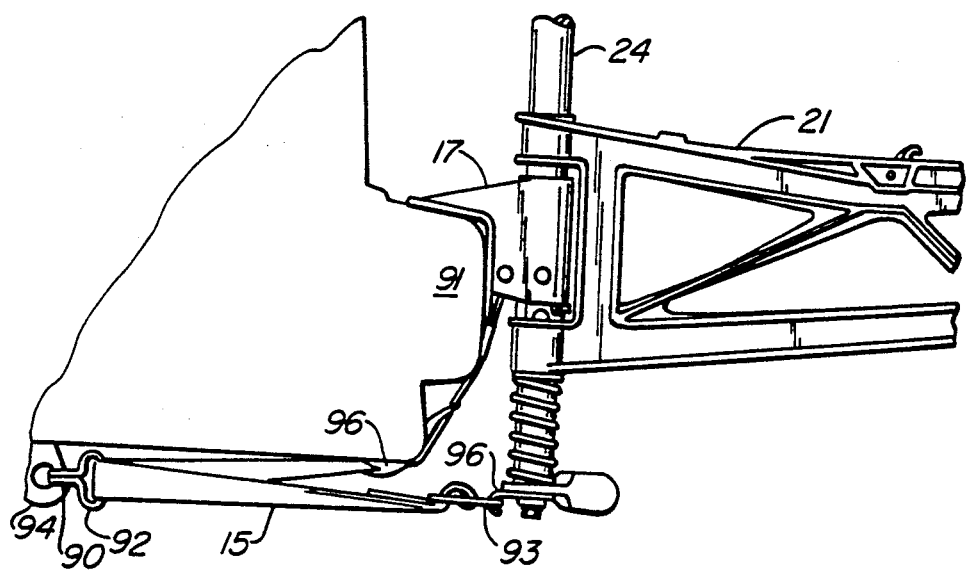
FIG._7a.

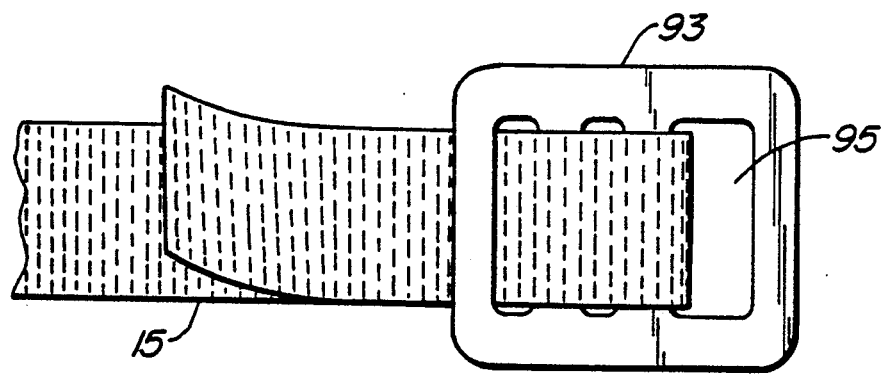
FIG.__7b.
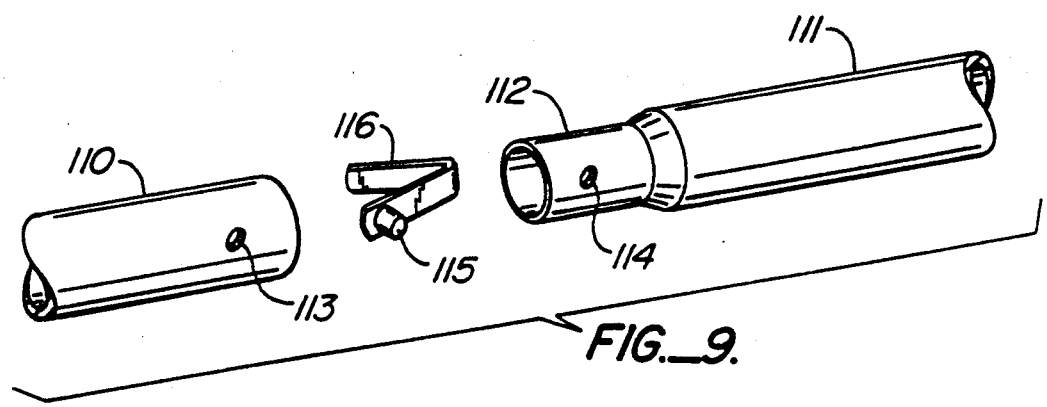
FIG.__9.

REAR MOUNTABLE CARRIER RACK

This invention relates to load-bearing structures, and particularly to carrier racks designed for mounting to motor vehicles such as automobiles to support bicycles and other types of cargo or recreational equipment.

BACKGROUND AND SUMMARY OF THE INVENTION

Carrier racks for motor vehicles exist in a wide variety of designs, including both roof-mountable and rear-mountable racks. Roof racks are &:he most common due to the ease by which they can be clamped to door openings or rain gutters, and their lack of interference with bumpers, doors and other features on the car's body.

Roof racks have certain drawbacks, however. Large items such as bicycles are awkward to mount onto and remove from roof racks, and two people are often needed. Stability is also a problem with upright loads such as bicycles. When used alone, roof racks generally provide support only from the bottom. Additional support and stabilization require additional hardware such as fork mounts and upright mounts. Fork mounts attach to the front forks of the bicycle, and require removal of the front wheel. Upright mounts grip a portion of the bicycle frame without removing the wheels, but frequently interfere with accessories on the bicycle such as pumps, waterbottles and cables, and do damage to paint and decals. In either case, these mounts are additional hardware requiring their own secure attachment to the roof rack.

Rear mounted carriers are generally secured to the vehicle at the rear bumper plus various points on the vehicle body, including the surface of the trunk door and the trunk door's upper edge, or the surface and top edge of a top-hinged rear door such as a hatchback. These are complex mountings, necessary in achieving stable and secure attachment of these carriers to the vehicle. As a result, these carriers are difficult to assemble and to remove for purposes of storage when not in use.

The mounting of bicycles to these rear-mounted carriers is also problematic. The most common mounting method involves attachment of the frame of the bicycle to the carrier, with little or no means of preventing the bicycle from swinging or moving with respect to the carrier. The result in many cases is that &:he bicycles contact the vehicle when the vehicle is in mo&:ion and do damage to the vehicle's surface finish. When two or more bicycles are held simultaneously, most carriers provide little in the way of preventing the bicycles from contacting and rubbing against each other.

Also, the method of mounting at the bicycle frame is itself damaging to the finish on the frame, which is generally a surface of high cosmetic value. Furthermore, in many cases, these carriers hold the bicycle too close to the ground, with the result that they contact the curb when one is trying to park the vehicle. Still further, the carrier itself frequently has bulky protruding parts which make parking difficult when the carrier is not in use.

The present invention provides a rear mountable carrier rack which overcomes these problems and offers a number of advantages.

In embodiments in which the rack is used for a bicycle, the rack supports the bicycle at four points on the wheels, one above and one below the center of each of the front and rear wheels. This is done with no contact between the rack and the bicycle frame, and yet with a stable and secure grasp of the bicycle avoiding contact at any surface-finished parts on either the bicycle or the vehicle.

The four-point support is achieved by support brackets, including upper brackets hooking under the rim of each wheel above the wheel center, and lower brackets containing straps or the like to tightly loop around or grasp the base of each wheel. In preferred embodiments, the brackets are pivotally mounted to the rack frame so that they can be rotated from an open or operating position to a closed position when not in use. In addition, stabilizing and locking features are supplied for each position.

In preferred embodiments, the straps on the lower bracket include a buckle which both adjusts the strap length and attaches in a removable manner to the bracket. The means of attachment is such that the buckle must be rotated to a position parallel to the bracket to be removed, this position being perpendicular to the position which the buckle occupies when the strap is in use. The fixed end of the strap is looped around a post inside a cavity in the bracket, the cavity opening to one side so that the strap is disengageable for easy replacement.

In further embodiments of the invention, the rack uses the rear bumper of the vehicle for its primary support, and is secured in place by tension-bearing straps at both the top of the rack and the bottom. The upper straps attach to a suitable opening or protrusion (such as a door frame or rain gutter) on the vehicle body, and the lower straps pass underneath the vehicle to engage the chassis. Contact with the rear bumper is achieved by bumper guides or stops on the rack, and in preferred embodiments, the bumper guides are in the shape of inverted L's contacting the top and rear bumper surfaces only.

In further preferred embodiments, attachment of the upper straps to the vehicle is achieved by a combination of a hook and resilient pad or plate which bends under tension around the curvature of the hook. With the hook and the resilient plate both inserted in the gap at the edge of a door such as a trunk lid or hatchback door, the hook and plate together apply an expansion force against the two sides of the gap, thereby making the hook secure.

In still further preferred embodiments, the carrier rack contains upper and lower rails which are each in halves so that the carrier can be disassembled for storage purposes. The halves are held together by an attachment mechanism which permits assembly and disassembly without tools.

Further features and advantages of the invention will be apparent from the description which follows.

BRIEF DESCRIPTION OF THE DRAWINGS

FIG. 1 is a perspective view of an illustrative embodiment of a carrier rack in accordance with the present invention.

FIGS. 2a and 2b are perspective views of the end of one of the brackets of the carrie: rack of FIG. 1, showing the wheel strap buckle both separated from and joined to the bracket.

FIG. 3 is a perspective view of the same bracket end shown in FIGS. 2a and 2b, shown from the opposite side, illustrating the means of attachment of the fixed end of the wheel strap.

FIG. 4 is a perspective view of the carrier rack of FIG. 1 shown mounted to the rear of a vehicle, showing both operating and closed positions.

FIG. 5 is an enlarged perspective view of one corner of the carrier rack shown in FIG. 1, illustrating the rotating and locking mechanism.

FIG. 6 is a side elevation view of the carrier rack of FIG. 1, shown mounted to the rear of an automobile.

FIG. 7a is an enlarged side view of the base of the carrier rack shown in FIG. 1, illustrating its attachment to the underside of the vehicle. FIG. 7b is an upper view of a threading plate serving as one of the features of the attachment means.

FIG. 8 is an enlarged view of the means by which the upper strap of the carrier rack shown in FIGS. 1 and 2 is secured to the vehicle body.

FIG. 9 is a perspective view of one of the horizontal rails of the frame of the carrier rack of FIG. 1, showing the two halves of the rail and the means by which the halves are connected and disconnected.

DETAILED DESCRIPTION OF THE INVENTION AND PREFERRED EMBODIMENTS

The embodiment shown in FIG. 1 exemplifies certain features of the carrier rack of the present invention. Notable among these are the frame 11, the upper tension-bearing straps 12, 13, the lower tension-bearing straps 14, 15, the bumper stops 16, 17 and the support brackets 18, 19, 20, 21.

The frame 11 may assume any of a variety of shapes, and will generally comprise a planar structure, constructed of rails arranged and connected in such a way that the structure is rigid. A rectangular arrangement of rails is shown, although other arrangements may be substituted, including crossed and nonparallel rails. The frame shown in FIG. 1 contains a top rail 22, a base rail 23 and side rails 24, 25. In this embodiment, the base rail 23 protrudes a short distance out of the plane formed by the top rail 22 and the side rails 24, 25, to minimize the possibilities of contact between the base rail and any features on the car protruding from either the bumper or from beneath the bumper, such as protruding license plates or exhaust pipes, or the bumper itself in the case of a curved bumper. Otherwise, the frame, and in particular its side arms, generally define a plane. When the carrier rack is in use, the plane of the frame is in a vertical position, as shown in FIG. 1, with the side arms 24, 25 upright.

The support brackets consist of two upper brackets 18, 20 and two lower brackets 19, 21. The lateral spacing between these brackets is designed to match the wheel base spacing on a standard bicycle. This is the spacing between the contact points at the base of the front and rear wheels, and is also equal to the spacing between the axles of the two wheels. The standard spacing is generally the same among all adult size bicycles, with small variations within a moderate range depending on the type of bicycle, including men's and women's bicycles, racing bicycles and mountain bicycles. In general, the spacing between the upper two brackets and also between the lower two brackets will be within the range of about 0.85 meter to about 1.25 meters, preferably from about 0.93 meter to about 1.15 meters.

With the carrier rack in the vertical position as shown, the two lower brackets 19, 21 are positioned directly below the two upper brackets 18, 20. The vertical distance between each pair of upper and lower brackets will be such that the lower brackets will be below the bicycle wheels which are hanging on the upper brackets. The distance will preferably be large enough to accommodate bicycle wheels of varying diameter. Thus, for most applications the distance between the upper surface of each upper bracket and the upper surface of the lower bracket directly underneath it will be between about 0.55 meter and 0.85 meter, preferably from about 0.65 meter to about 0.75 meter.

Each of the two upper support brackets 18, 20 contain transverse grooves 30, 31, 32, 33 to receive the rim of a bicycle wheel. These grooves may be one or more in number per bracket, preferably two as shown. Corresponding grooves on the two upper brackets 18, 20, for instance grooves 30 and 32, hook under the rims of the front and rear wheels, respectively, of a bicycle, the bicycle being in the upright position with each wheel extending around each upper bracket 18, 20 down toward the lower brackets 19, 21. To each of these lower brackets are secured a pair of straps 34, 35, 36, 37 which loop around the bicycle wheel at the bottom and are tightened in place to hold the wheels and thus the bicycle or bicycles securely on the rack. As will be readily apparent to those skilled in the art, the rack may be used to support a variety of types of loads, but is of particular interest for carrying bicycles.

Features of preferred forms of the wheel straps 34, 35, 36, 37 will now be described in detail. Using wheel strap 37 as an example, each wheel strap has a fixed end 38 and an adjustable end 39. The adjustable end passes through a buckle 40 which serves both to attach the adjustable end 39 of the strap to the bracket 21 once the strap has been passed through the wheel, and to permit adjustment of the size of the loop formed by the strap, thereby tightening the strap around the wheel.

Detailed views of the buckle and wheel strap connections are shown in FIGS. 2a, 2b and 3. FIGS. 2a and 2b show the end of the bracket 21 from one side (the side shown in FIG. 1) and FIG. 3 shows the same end of the same bracket from the opposite side.

In FIGS. 2a and 2b, the fixed end 38 and the adjustable end 39 of the wheel strap are shown in dashed lines. The buckle 40 contains a central crossbar 41 over which the strap end 39 is threaded the crossbar being shaped in the conventional manner to supply friction to the strap when the strap is pulled against it in a loosening direction. The strap also contains an end crossbar 42 which, together with the sides 43, 44 of the buckle, forms a loop. To attach the buckle to the bracket, this loop is engaged with a hook 45 on the upper surface of the bracket 21.

The end crossbar 42 is substantially flat in shape, with an elongated cross section. Likewise, the hook 45 provides an opening 46 of limited height, which the end crossbar 42 can pass through only when the buckle is substantially parallel to the bracket 21, as shown in FIG. 2a. Thus, the loop formed by the end crossbar 42 can be engaged or disengaged with the hook 45 only when the buckle 40 is oriented as shown in FIG. 2a with respect to the bracket. Once the end crossbar 42 is inserted under the hook 45, the buckle 40 is rotated approximately 90° to the position shown in FIG. 2b, substantially perpendicular to the bracket 21. Once in this position, the buckle is securely held by the hook and cannot be removed until it is rotated back to the position shown in FIG. 2a. The buckle will remain in the position shown in FIG. 2b while the wheel strap is held tight around the wheel. A finger tab 47 on the end of the buckle opposite the end crossbar 42 facilitates manipulation of the buckle by hand.

FIG. 3 illustrates the means of attachment of the fixed end 38 of the wheel strap to the bracket 21. The fixed end 38 of the strap is formed into a loop 60. This loop is passed through a slot 61 in the upper surface of the bracket, thereby entering a cavity 62 in the bracket. Inside the cavity is a post 63, extending transversely with respect to the general direction of the bracket. The loop 60 is looped around the post 63 and the strap and bracket are thus securely engaged. It will be noted that the cavity 62 is open to one side of the bracket (the side shown in FIG. 3). This permits one to easily engage and disengage the loop 60 and post 63 by hand. The strap can thus be easily and quickly removed and replaced when necessary.

Returning to FIG. 1, the upper and lower brackets 18, 19, 20, 21 are mounted to the vertical side arms 24, 25 of the frame in a pivotal manner. Preferred embodiments of the invention contain structural features which lock the brackets in one of two positions, an open or operating position and a closed or folded position. These features are intended to secure the brackets into these positions without the need for keys or other locking tools, yet allow them to be released readily from either position by hand.

The two positions are shown in FIG. 4. The open or operating position, which is identical to the position shown in FIG. 1, is shown in FIG. 4 in dashed lines. In this position, the upper and lower brackets all extend directly rearward from the vehicle perpendicular to the plane of the frame 11. The closed or folded position is shown in solid lines, with the support arms rotated 90° inward, to a position within the plane of the frame.

The lock and release mechanism for the embodiment shown in FIGS. 1 and 4 is shown in detail in FIG. 5. This figure depicts the upper left bracket 20 in a position intermediate between the operating and closed positions. The bracket 20 includes a pair of sleeves 70, 71 which encircle the frame side arm 24 permitting rotation of the bracket with respect to the side arm. The two positions of the bracket (and additional positions along the arc of rotation, if desired) are defined by the combination of a notched collar 72, a stud 73 mating with the notches on the notched collar, and a spring 74 urging the notched collar and stud into engagement.

The notched collar may be affixed either to the side arm 24 or the bracket 20, and the stud vice versa. Accordingly, one or the other of &:he notched collar and stud will be stationary and the other rotatable with the rotation of the bracket. The preferred arrangement is that shown in FIG. 5, with the notched collar secured in immovable fashion to the side arm and the stud 73 projecting from the support arm 20. In this embodiment, the spring 74 is compressed between the notched collar 72 at &:he end opposite the notches and a flange 75 on the lower sleeve 71 of the support arm 20. The spring 74 thus urges the support arm 20 downward, thereby urging the stud 73 to one of the notches 76 of the notched collar.

In the intermediate position shown in FIG. 5, the stud is positioned midway between two notches, the notch immediately to the left of the stud representing the forward position, and the notch immediately to the right of the stud (not visible in the drawing) representing the closed position. A third notch at the far left provides an additional option. To release the stud from any of these notches, the operator merely pulls upward on the support arm 20 while pressing down on the top rail 22 of the frame, thereby compressing the spring 74 and lifting the stud 73 out of the notch 76 for rotation to another position. Relaxation of the manual pressure permits the spring 74 to force the stud into engagement with the notch, holding the bracket in the desired position.

Further stabilization of the bracket in the operating position is provided by a ribbed beam 77. This beam is a trough-shaped projection, mounted to the side arm 24 in a manner incapable of rotation around the side arm, extending from the side arm in the direction in which the bracket 20 will project when in the operating position. The ribs 78, 79 on the beam are spaced to receive between them the lower beam 80 of the bracket 20. The spring 74 urges the bracket into the ribbed beam 77, and release of the bracket from this beam is achieved when the bracket is compressed against the spring.

While the mechanism in FIG. 5 is shown for only one bracket, the identical mechanism or its mirror image is included on each of the remaining brackets. In preferred embodiments, the mechanisms are arranged such that the upper brackets 18, 20 are released for rotation by pulling upward, and the lower brackets 19, 21 are released for rotation by pressing downward.

Returning now to FIG. 1, various embodiments of the means of attachment of the carrier rack to the rear of a motor vehicle will now be described in detail.

The bumper stops 16, 17 are at least one in number, preferably two as shown, and serve to position the frame 11 of the carrier rack at a particular height with respect to the rear vehicle bumper. The bumper stops may be of any shape that will engage the bumper and serve as stops or guides for the position of the vertical side rails 24, 25. Bumper stops in the shape of inverted L's are shown in the drawing, the horizontal portion of each L resting on the upper surface of the bumper. In alternate designs, stops or guides may engage the bumper from below or from both above and below. The bumper stops are preferably of a material with a small degree of flexibility to conform to bumpers which are slightly angled or curved with the bumper edge resting snugly inside each stop. The bumper stops are located toward the lower ends of each side rail, so that the major portion of the frame is held above the bumper. The load is thus held high by the carrier, out of interference with curbs and exhaust pipes.

With the bumper stops 16, 17 thus engaged with the bumper, the frame is secured to the vehicle by tension-bearing vehicle-mounting straps 12, 13, 14, 15 at the top and bottom. The upper vehicle-mounting straps 12, 13 are at least one in number, preferably two as shown. These straps secure the upper portion of the carrier frame from a point at or near the top rail 22, preferably from the top rail itself as shown, to the top of the vehicle. The lower vehicle-mounting straps 14, 15 are like the upper straps, at least one in number, preferably two as shown. The lower straps secure the lower end of the carrier frame from points at or near the base rail, preferably points toward the lower end of the side rails 24, 25 as shown, to a location on the underside of the vehicle chassis.

The vehicle-mounting straps are flexible, preferably made of a strong woven fabric, and preferably adjustable through the use of tightening buckles or threading plates 85, 86 (with similar elements on &he lower straps 14, 15, although not visible in the drawing). Such elements are well known among those skilled in the art.

Each of these vehicle-mounting strap is joined to a fastener such as hooks 87, 88, 89, 90 as shown. These fasteners will attach to projections, gaps, loops or other accessible features on the upper body surface and lower chassis surface, respectively. Depending on the features to which these fasteners are attached, the fasteners may assume a variety of forms, including hooks as shown, or rings, loops, anchors, or any of various other shapes. The fasteners on the upper straps, for example, may be attached to a rain gutter over the vehicles rear window, or they may be insertable into the gap at the hinge end of a trunk door. In the case of hatchback vehicles, such as that shown in FIG. 6, the fasteners may be inserted into the gap at the hinge end of the hatchback window. The bottom fasteners are attachable to any sturdy chassis points on the underside of the vehicle. While these lower fasteners may not be attached to any moving portion of the rear suspension of the vehicle, there are a number of alternative locations usually available for attachment. Tow loops, which are found on most vehicles manufactured after 1984, are particularly convenient points of attachment.

The carrier frame is installed on the rear of the vehicle as shown in FIG. 6. To do this, the frame is first centered on the vehicle's rear bumper with the bumper stops 16, 17 resting on the upper surface of the bumper. The upper hooks 87, 88 are engaged with the rain gutter or door edge gap, whichever is available and convenient. The upper straps 12, 13 are then adjusted to a length which places the frame in a position tilted slightly toward the rear. In the view shown in FIG. 6, the frame 11 would thus be tilted in the clockwise direction with the bumper brackets 17 as the axis, so that the upper rail 22 is displaced approximately one foot from to the right of its upright position. The lower hooks 89, 90 are then attached to the tow loops or other sturdy chassis points underneath the vehicle, and the lower straps 14, 15 are adjusted to tension. The upper straps 12, 13 are then pulled tighter until the frame 11 is vertical. All straps will then be under tension and the frame will be securely mounted and capable of bearing substantial loads without significant movement.

FIGS. 7a and 7b illustrate the arrangement and connections of one of the lower straps 15, with the bumper bracket 17 resting on the bumper 91. One end of the strap 15 is riveted to the underside of the bumper stop 17, and the strap 15 passes through a loop 92 on the hook 90, then back to the bottom end of the vertical side rail 24, where the strap is looped through a threading plate 93, which provides means for both tightening the strap 15 and hooking the strap onto the base of the side rail 24. The hook 90 is shown in engagement with the tow loop 94 on the vehicle chassis.

The threading plate 93 is shown from above in FIG. 7b. A loop 95 on the end of the threading plate engages a hook 96 (FIG. 7a) on the carrier frame side arm 24. As mentioned above, any conventional fitting may be used on each of the straps to permit tightening and length adjustments.

The embodiment shown in FIG. 7a also shows a protective pad 96, such as a semi-flexible plastic plate, threaded onto the strap 15 at the point where the strap contacts the edge of the vehicle body or chassis. This pad protects the strap from any object that would cause abrasion of the strap webbing.

FIG. 1 shows an additional feature on the upper straps to prevent the upper hooks 87, 88 from becoming loose during the typical jostling that a motor vehicle experiences when moving. These are resilient plates 97, 98 which are bendable under tension.

The manner in which these plates function to enhance the security of the hooks 87, 88 is shown in FIG. 8. The hook 87 in FIG. 8 is shown inserted in a gap 99 on the vehicle body, such as the top edge of a hatchback window. The resilient plate 97 is bent around the hook 87 and likewise inserted in the gap 99. The tension of the plate 97 presses against the gap on the side opposite the hook. This helps to maintain the force cf the hook against the other edge of the gap even when the tension in the strap 12 begins to drop significantly. The hook 87 is thus significantly less susceptible to disengagement during vehicle jostling. The resilient plates 97, 98 may be of any material which provides the appropriate tension, including the same or a similar plastic as the protective pad 96 shown in FIG. 7a, although possibly of greater thickness to provide the necessary tension when bent around the hooks 87, 88.

Returning once again to FIG. 1, a preferred embodiment will now be described in which the top rail 22 and base rail 23 are each capable of being disconnected into two halves to facilitate storage of the carrier rack when not in use. The two halves and the method by which they are connected are shown in detail in FIG. 9. The features shown in this figure apply to both the top rail and the base rail.

The two halves 110, 111 are of tubular stock, and are shown separated in FIG. 9. The right half 111 has a narrowed segment 112 at its open end, which slides inside the open end of the left half 110. The overlapping portions of the two halves each contain a hole 113, 114, the two holes positioned to be in alignment with each other when the two halves are joined. A spring-mounted knob 115 inside the narrowed segment 112 of the right half passes through the holes 113, 1!4, the spring 116 urging the knob into the holes and thereby holding the two halves together. The halves may be separated by pressing inward on the knob with one's finger until the knob clears the outermost hole 113, and pulling the halves apart. Elastic sleeves 117, 118 as shown in FIG. 1 are placed over the knob and the overlapping segments of the two halves for both the top and base rails, to provide further security to the connection and prevent the exposure of sharp edges of the tubular stock.

The foregoing is offered for purposes of illustration only. It will be readily apparent to those skilled in the art that numerous variations, modifications and substitutions may be made in the materials used, the shape and arrangement of the various parts, and their functional relationships from what is described herein, without departing from the spirit and scope of the invention.

What is claimed is:

1. A bicycle carrier rack mountable to the rear of a motor vehicle, comprising:
   a frame;
   a pair of upper brackets mounted to said frame spaced apart by a distance substantially equal to the wheel base spacing of a standard bicycle;
   a pair of lower brackets mounted to said frame, one directly bellow each of said upper brackets;

upper retaining means for retaining the rm of a bicycle wheel, at a point above the center of said wheel, at a fixed location on each of said upper brackets;

lower retaining means for securing said bicycle wheel at a point below the center thereof on each of said lower brackets, said lower retaining means comprised of a strap on each said lower bracket, sad strap having a fixed end and an adjustable end, said adjustable end threaded through a buckle, said buckle including a loop engageable with a hook on sad lower bracket, said loop and hook shaped such that said hook and loop are engageable only when said buckle is positioned parallel to said bracket; and means for securing said frame in a vertical position to the rear of a motor vehicle.

2. A bicycle carrier rack mountable to the rear of a motor vehicle, comprising:

a frame;

a pair of upper brackets mounted to sad frame spaced apart by a distance substantially equal to the wheel base spacing of a standard bicycle;

a pair of lower brackets mounted to said frame, one directly below each of said upper brackets;

upper retaining means for retaining the rim of a bicycle wheel, at a point above the center of said wheel, at a fixed location on each of said upper brackets;

lower retaining means for securing said bicycle wheel at a point below the center thereof on each of said lower brackets, said lower retaining means comprised of a strap on each said lower bracket, said strap having a fixed end and an adjustable end, said fixed end looped to define a strap end loop, said lower bracket containing a transverse end post to engage said strap end loop, said transverse post positioned inside a cavity opening to one side of said lower bracket to permit disengagement of said strap end loop from said transverse post for purposes for replacing said strap; and means for securing said frame in a vertical position to the rear of a motor vehicle.

3. A bicycle rack in accordance with claim 2 in which aid cavity contains a slot to permit passage of said strap into said cavity.

4. A bicycle carrier rack mountable to the rear of a motor vehicle, comprising:

a frame;

a pair of upper brackets mounted to said frame spaced apart by a distance substantially equal to the wheel base spacing of a standard bicycle;

a pair of lower brackets mounted to said frame, one directly below each of said upper brackets;

upper retaining means for retaining the rim of a bicycle wheel, at a point above the center of said wheel, at a fixed location on each of said upper brackets;

lower retaining means for securing said bicycle wheel at a point below the center thereof on each of said lower brackets, said lower retaining means comprised of a strap on each said lower bracket, said strap having a fixed end and an adjustable end, said fixed end looped to define a strap end loop; said lower bracket containing a transverse post to engage said strap end loop, said transverse post positioned inside a cavity opening to one side of said lower bracket to permit disengagement of said strap end loop from said transverse post for purposes replacing said strap, said cavity further containing a slot to permit passage of said strap; and said adjustable end of said strap threaded through a buckle, said buckle including a loop engageable with a hook on said lower bracket, said loop and hook shaped such that said hook and loop are engageable only when said buckle is positioned parallel to said bracket; and means for securing said frame in a vertical position to the rear of a motor vehicle.

5. A carrier rack mountable to the rear of a motor vehicle having a protruding rear bumper, said carrier rack comprising:

a frame having a top rail and a base rail joined by a pair of vertical side rails;

a suspension system comprising:
(a) a pair of bumper-engaging members, one secured to each of said vertical side rails;
(b) at least one upper tension-bearing strap secured to said frame on or near said top rail and containing upper attachment means for securing said upper tension-bearing strap to the body of said motor vehicle, said upper attachment means comprising a hook and a resilient member bendable under tension around said hook; and
(c) at least one lower tension-bearing strap secured to said frame on or near said base rail and having lower attachment means for securing said lower tension-bearing strap to the chassis of said motor vehicle; and means for securing a load to said frame.

* * * * *